(12) United States Patent
Schroeder et al.

(10) Patent No.: US 7,577,890 B2
(45) Date of Patent: Aug. 18, 2009

(54) SYSTEMS AND METHODS FOR MITIGATING LATENCY ASSOCIATED WITH ERROR DETECTION AND CORRECTION

(75) Inventors: Michael A. Schroeder, Plano, TX (US); Christopher Michael Brueggen, Allen, TX (US); Gary B. Gostin, Plano, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 734 days.

(21) Appl. No.: 11/040,380

(22) Filed: Jan. 21, 2005

(65) Prior Publication Data

US 2006/0168503 A1    Jul. 27, 2006

(51) Int. Cl.
*H04L 1/18* (2006.01)
(52) U.S. Cl. .................. 714/748; 714/776; 714/758; 714/799
(58) Field of Classification Search .................. 714/748, 714/49, 758, 799
See application file for complete search history.

(56) References Cited

U.S. PATENT DOCUMENTS

| | | | |
|---|---|---|---|
| 4,485,471 A | 11/1984 | Singh et al. | |
| 5,533,189 A * | 7/1996 | Cheong et al. | 714/6 |
| 5,629,950 A * | 5/1997 | Godiwala et al. | 714/805 |
| 6,304,992 B1 | 10/2001 | Cypher | |
| 6,453,440 B1 | 9/2002 | Cypher | |
| 6,463,506 B1 | 10/2002 | McAllister et al. | |
| 6,477,682 B2 | 11/2002 | Cypher | |
| 6,493,843 B1 | 12/2002 | Raynham | |
| 6,502,218 B1 * | 12/2002 | George et al. | 714/805 |
| 6,519,717 B1 | 2/2003 | Williams et al. | |
| 6,574,768 B2 | 6/2003 | Cypher | |
| 6,584,595 B2 | 6/2003 | Cypher | |
| 7,003,710 B2 * | 2/2006 | Tomaru et al. | 714/751 |
| 7,039,851 B2 * | 5/2006 | Wang et al. | 714/776 |
| 7,283,528 B1 * | 10/2007 | Lim et al. | 370/392 |
| 2002/0038442 A1* | 3/2002 | Cypher | 714/757 |
| 2007/0109099 A1* | 5/2007 | Raphaeli et al. | 340/10.2 |

OTHER PUBLICATIONS

Timothy J. Dell, "A White Paper on the Benefits of Chipkill-Correct ECC for PC Server Main Memory", IBM Microelectronics Division, Nov. 19, 1997, pp. 1-23.

* cited by examiner

*Primary Examiner*—Esaw T Abraham

(57) ABSTRACT

Systems and methods for mitigating latency associated with error detection and correction of a data structure are disclosed. One embodiment of a system may comprise a packet generator that builds a response packet associated with a request for a data structure based on a tag portion of the data structure. The system may also comprise an error detection and correction (EDC) component that detects and corrects errors in the data structure concurrently with the building of the response packet by the packet generator.

27 Claims, 6 Drawing Sheets

SYSTEMS AND METHODS FOR MITIGATING LATENCY ASSOCIATED WITH ERROR DETECTION AND CORRECTION

BACKGROUND

Error codes are commonly used in electronic systems to detect and/or correct data errors, such as transmission errors or storage errors. One common use of error codes is to detect and correct errors with data stored in a memory of computer system. For example, error correction bits, or check bits can be generated for data prior to storing data to one or more memory devices. The error or correction bits are appended to the data to provide a data structure that is stored in memory. When the data is read from the one or more memory devices, the check bits can be used to detect or correct errors within the data. Errors can be introduced, for example, either due to faulty components or noise in the computer system. Faulty components can include faulty memory devices or faulty data paths between the devices within the computer system, such as faulty pins.

Error management techniques have been developed to mitigate the effects associated with these errors. One simple technique used for personal computers is known as parity checking. Parity checking utilizes a single bit associated with a piece of data to determine whether there is a single bit error in the data. Parity checking cannot detect multiple bit errors and provided no means for correcting errors. A more sophisticated system, such as a server, uses error correction codes (ECCs) to detect and correct some errors. An error correction code (ECC) consists of a group of bits, or codes, associated with a piece of data. A typical ECC system may use eight ECC bits (check bits, correction bits) for a 64-bit piece of data. The ECC bits provide enough information for an ECC algorithm to detect and correct a single bit error, or to detect double bit errors.

SUMMARY

One embodiment of the present invention may comprise a system for mitigating latency associated with error detection and correction of a data structure. The system may comprise a packet generator that builds a response packet associated with a request for a data structure based on a tag portion of the data structure. The system may also comprise an error detection and correction (EDC) component that detects and corrects errors in the data structure concurrently with the building of the response packet by the packet generator.

Another embodiment may comprise a memory system. The memory system may comprise an error detection and correction (EDC) component that detects and corrects errors in given code word associated with a data structure formed from a plurality of code words, and a packet generator that builds a response packet associated with a request for a data structure based on a tag portion of the data structure residing in a first code word of the plurality of code words. The memory system may also comprise a plurality of memory devices that store the data structure based on a given memory address, and provide the EDC component the plurality of code words in response to a request for the data structure. The EDC component may receive the plurality of code words in a sequential manner and forward a copy of the tag portion from the first code word to facilitate the building of a response packet by the packet generator concurrently with the error detection and correction of the data structure.

Yet another embodiment may comprise a system for correcting errors in a data structure in response to a request for the data structure. The system may comprise means for performing error detection and correction on a data structure that includes a tag portion, means for issuing a command to build a response packet based on the tag portion, and means for building a response packet based on the issue command concurrently with the error detection and correction on the data structure.

Still yet another embodiment may comprise a method for mitigating latency associated with error detection and correction of a data structure. The method may comprise providing a data structure in response to a request for the data structure, which includes a tag portion. The method may further comprise building a response packet based on the tag portion, and performing error detection and correction on the data structure concurrently with the building of the response packet.

Still yet a further embodiment may comprise a method for mitigating latency associated with a data request. The method may comprise providing a plurality of code words forming a data structure in sequential order, in which a first code word that is provided of the plurality of code words includes a tag portion. The method may further comprise building a header of a response packet based on the tag portion, performing error detection and correction on the plurality of code words in sequential order concurrently with the building of the header, and transmitting the response packet with data associated with a given code word that has been determined to be without errors concurrently with the performing of error detection and correction on a subsequent code word.

DETAILED DESCRIPTION

This disclosure relates generally to systems and methods for mitigating latency associated with error detection and correction of a data structure, for example, in response to a request for the data structure. The error detection and correction can employ error correction code (ECC) techniques that detect and correct bit errors in a data structure. The systems and methods perform operations on at least a portion of the uncorrected data structure as error detection and correction is performed on the data structure. An uncorrected or speculative data structure refers to a data structure in which error detection and correction has not been performed. If an error is detected by the error detection and correction, the operations on the uncorrected data structure are halted and the results discarded. The operations are then performed on the corrected data. If an error is not detected, the operations on the uncorrected or speculative data structure continue, thus mitigating the latency penalty associated with performing error detection and correction on the data structure, prior to performing any operations on the data structure. In many systems, an ECC error is a relatively rare event, so the average latency penalty due to error detection and correction can closely approach zero.

Figure 1:
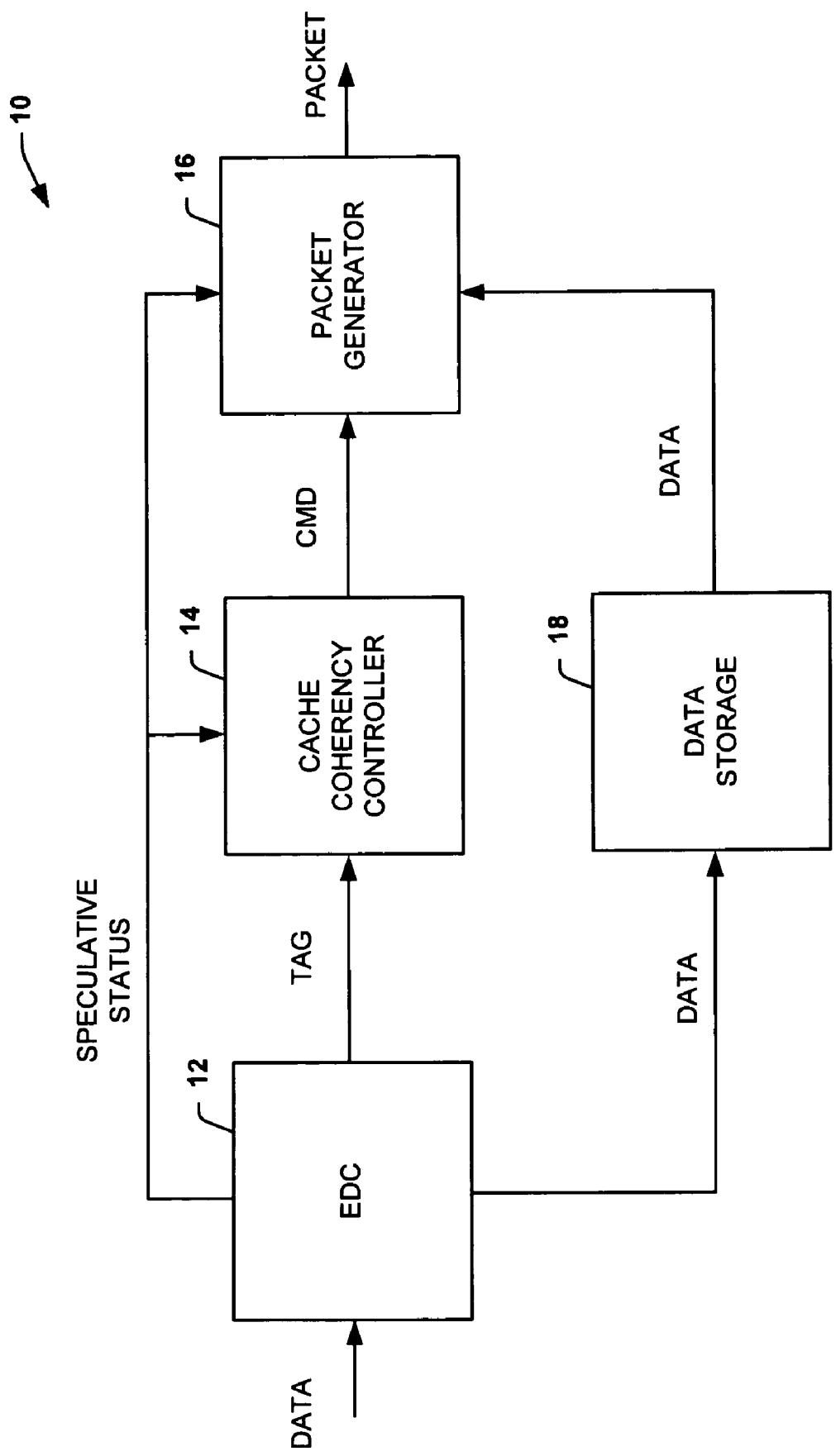
FIG. 1 illustrates a block diagram of an embodiment of a system for mitigating latency associated with error detection and correction of a data structure.

FIG. 1 illustrates a system 10 for mitigating latency associated with error detection and correction of a data structure. The system 10 can be part of a server or other computer system that performs error detection and correction on data structure. The system 10 includes an error detection and correction (EDC) component 12, a cache coherency controller 14, a packet generator 16 and a data storage device 18. A data structure is provided to the EDC component 12 in response to a request for the data structure. The request can be from a processor associated with the system 10, another processor in a multi-processor system, an I/O device or a variety of other devices that may request the data structure. The data structure can be a cache line read from memory or a cache associated with the system 10.

The data structure includes a tag portion, ECC correction bits and a data portion. The data structure can be comprised of a plurality of code words, such that the EDC component 12 performs error detection and correction on each of the plurality of code words in a sequential manner. For example, the plurality of code words can include four 288 bit code words each having 24 check bits for each code word. The tag portion of the data structure resides in the first code word. The tag portion identifies where the most up to date version or coherent version of the data structure resides. For example, the tag portion can provide an indication that the data structure is the coherent version (e.g., resides in memory), or that the coherent version resides in a cache associated with the system 10, or another cache associated with another processor of a multiprocessor system.

In one embodiment, the code words are provided to the EDC component 12 in 144 bit portions, such that the entire data structure is provided to the EDC component in eight 144 bit portions, for example, over 8 clock cycles in response to a request for a given data structure. The EDC component 12 receives a first code word of a data structure and forwards a copy of the tag portion to the cache coherency controller 14 as it begins error detection and correction on the first code word. The tag portion resides in the first code word and can be, for example, the first 26 bits of the first code word. The cache coherency controller 14 employs the tag to determine which packet type to build. For example, if the tag portion indicates that the coherent version of the data structure resides in the memory or the cache associated with the system 10, a data packet is built that will transmit a copy of the data residing in the data structure. If the tag portion indicates that the coherent version of the data structure resides at another entity, such as a cache associated with another processor in a multi-processor system, a request packet will be built that provides a request for the coherent version of the data. For example, in a multi-processor system, the packet can be a source snoop packet which generates a snoop request for the coherent version of the data structure or a recall request for the coherent version of the data structure.

The cache coherency controller 14 analyzes the tag portion of the data structure and generates a command to the packet generator 16 that provides instructions for building a response packet associated with the data structure request. At substantially the same time, the EDC component 12 performs error detection and correction on the code words sequentially based on the corresponding ECC bits associated with each code word. As the error detection and correction is completed, the data associated with the corresponding code words are loaded into the data storage 18, until all of the data associated with each of the code words of the data structure are loaded into the data storage 18. The data storage 18 retains copies of data associated with commands being generated by the cache coherency controller 14. Alternatively, the EDC component 12 can forward the data to the data storage as uncorrected or speculative data.

The packet generator 16 builds a header associated with the response packet based on the command generated by the cache coherency controller 14. If the response packet is a request packet, the data associated with the data structure is retained until the request packet is resolved. If the request packet cannot be resolved, then the data associated with the data structure in the data storage 18 can be employed to provide a coherent version of the data. If the request packet can be resolved, then the data associated with the data structure in the data storage 18 can be overwritten. If the response packet is a data packet, the data associated with the data structure can be sequentially retrieved from the data storage 18 and transmitted with the header associated with the data packet, once the data has determined to be correct by the EDC component 12.

The EDC component 12 provides a speculative status indication to both the cache coherency controller 14 and the packet generator 16. The speculative status indication can provide an indication of whether or not an error was detected in the data structure. For example, the speculative status indication can provide an indication of whether or not an error was detected in any of the code words associated with the data structure. If an error was detected in any of the code words, the packet generator 16 aborts building of the packet, and builds a new packet based on the corrected data structure. Alternatively, a speculative status indication can be provided for each code word. For example, if an error is detected in the first code word containing the tag portion, the packet generator 16 aborts building of the packet. A new packet is then built based on the corrected data structure with a corrected tag portion. If an error was detected in subsequent code words, for a response packet that is a data packet, the packet generator 16 can retain the header and any correct data, but waits for corrected data associated with the error prior to transmitting or retransmission of a data packet. If an error was not detected in the data structure, the packet generator 16 transmits the data packet with the uncorrected or speculative data, thus mitigating latency associated with waiting for the EDC component 12 to perform error detection and correction prior to building of the data packet.

In one embodiment, the packet generator 16 is operative to begin transmission of the data packet once it is determined that an error has not occurred in the tag. The packet generator 16 builds a header and begins extracting code word data from the data storage 18 and begins transmitting the data packet with the extracted data, once it is determined that the extracted data is correct. If an error is detected in the data structure by the EDC 12 in subsequent code words, the EDC 12 begins providing dummy data into the data storage 18. Additionally, the EDC 12 informs the packet generator 16 that an error has occurred via the speculative status indicator. The packet generator 16 then begins transmitting dummy data including an indication (e.g., an invalid flag) that the subsequent data being transmitted is not valid. The EDC 12 then corrects the data and loads the corrected data into the data storage 18. Additionally, the EDC 12 informs the packet generator 16 that the corrected data is available in the data storage. The packet generator 16 then begins transmitting the corrected data including an indication (e.g., a valid flag) that the subsequent data being transmitted is valid.

Figure 2:
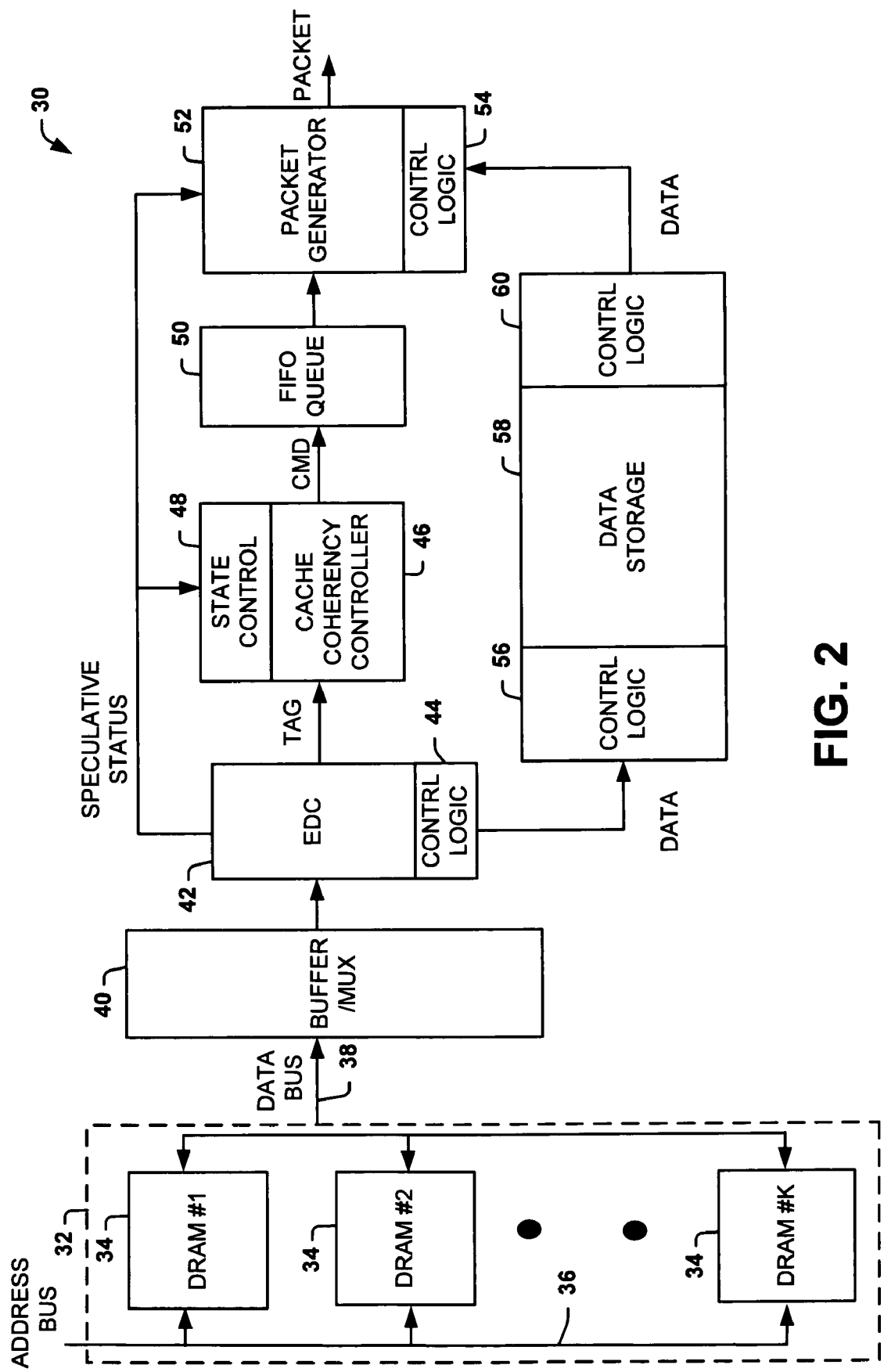
FIG. 2 illustrates a block diagram of an embodiment of a system for mitigating latency associated with a data request.

FIG. 2 illustrates one particular implementation of a system 30 for mitigating latency associated with a data request. The system 30 can be a memory system that includes a system memory 32 that is comprised of a plurality of DRAM devices 34, labeled memory device #1 through #K, where K is an integer greater than one. For illustrative purposes, the DRAM devices 34 of FIG. 2 will be discussed as being 4-bit column width devices. However, other column width devices (e.g., 8, 16, 32, 64, etc.) can be employed. The system memory 32 is coupled to a data bus 38 and an address bus 36. The size of the data bus 38 and data structure read and written to the system memory 32 during a DRAM cycle is equal to the number of memory devices 34 multiplied by the bit column width of the memory devices 34. In the present example, the system memory 34 can be comprised of 72 DRAM devices with 4 bit-width columns. Therefore, the size of the data bus 38 and data structure stored and read in a single memory cycle is 288 bits.

The system 30 includes an error detection and correction (EDC) component 42 that performs error correction and detection on 288 bits including 24 check bits (e.g., 264 data bits, 24 check bits). The functionality of the EDC component 42 can be comprised of hardware, software or a combination of hardware and software. The EDC component 42 can be formed from an application specific integrated circuit or very large scale integrated circuit (VLSI).

A buffer/multiplexer device 40 is coupled to the system memory 32 via the data bus 38, and to the EDC component 42 via a data bus. During a read operation, a data structure associated with an address is read from the plurality of DRAM devices 34 and provided to the buffer/multiplexer 40 via the data bus 38. The buffer/multiplexer 40 separates or partitions the 288 bit data code word into a first 144 bit portion and a second 144 bit portion, which are sequentially transmitted to the EDC component 42. This process is repeated for subsequently read code words, such that a processing pipeline can be established.

The system 30 also includes a cache coherency controller 46, a first-in-first-out (FIFO) command queue 50, a packet generator 52 and a data storage device 58. A data structure is provided to the EDC component in 144 bit portions in response to a request for the data structure, as discussed above with respect to FIG. 1. The request can be from a processor associated with the system, another processor in a multi-processor system, an I/O device or a variety of other devices that request the data structure. For example, the data structure can be comprised of four 288 bit code words each having 24 check bits for each code word. The data structure can be a cache line that resides in a memory or a cache associated with the system 30. The tag portion of the data structure resides in the first code word and identifies where the coherent version of the data structure resides. For example, the data structure can be the coherent version or the coherent version may reside within a cache associated with processor of a multiprocessor system.

As previously discussed, the code words are provided to the EDC component 42 in 144 bit portions, such that the entire data structure is provided to the EDC component 42 in eight 144 bit portions, for example, over 8 clock cycles in response to a request for a given data structure. The EDC component 42 forwards a copy of the tag portion to the cache coherency controller 46 and begins performing error detection and correction on the data structure. The cache coherency controller 46 employs the tag to determine whether to build a data packet or a request packet based on whether or not the coherent version of the data structure resides in the system memory 32 or some other entity.

If the tag portion indicates that a request packet will be built, then the cache coherency controller 46 stores a command in the FIFO queue 50 that instructs the packet generator 52 to build a request packet associated with the data structure request. In this situation, the EDC component 42 will perform the error detection and correction associated with the data structure and store the data associated with the data structure in the data storage 58, until the request packet is resolved. If the request packet cannot be resolved, then the data associated with the data structure in the data storage 58 can be employed to provide a coherent version of the data. If the request packet is resolved, then the data associated with the data structure in the data storage 58 can be overwritten.

If the tag portion indicates that a data packet will be built, then the cache coherency controller 46 stores a command in the FIFO queue 50 that instructs the packet generator 52 to build a data packet associated with the data structure request. In this situation, the EDC component 42 continues performing error detection and correction on the data structure, and storing data associated with the data structure in the data storage 58. The packet generator 52 builds a header associated with the data packet and can sequentially retrieve data associated with the data structure from the data storage 58 for transmission.

The cache coherency controller 46 also maintains a state control structure 48 associated with each of the issued commands to the FIFO 50. The state control structure 48 can maintain status indicators that provide an indication of whether the issue command is associated with a tag of a speculative data structure, or if the issue command is associated with a tag of a correct data structure. The state control structure 48 can maintain other status bits or control bits associated with the issue command including, for example, a copy of the tag.

The EDC component 42 performs error detection and correction on the code words sequentially based on the corresponding ECC bits in the respective code word. As the error detection and correction is completed, the data associated with the corresponding code words are loaded into the data storage 58, until each of the code words are loaded into data storage 58. The EDC component 42 also provides a speculative status indication to both the cache coherency controller 46 and the packet generator 52. The speculative status indication can provide an indication of whether or not an error was detected in the data structure.

For example, the speculative status indication can provide an indication of whether or not an error was detected in any of the code words associated with the data structure. If an error was detected in any of the code words, the packet generator 52 can abort building of the packet, and build a new packet based on the corrected data structure. Alternatively, a speculative status indication can be provided for each code word. For example, if an error is detected in the first code word containing the tag portion, the packet generator 52 aborts building of the packet. A new packet is then built based on the corrected data structure with a corrected tag portion. If an error was detected in subsequent code words, for a response packet that is a data packet, the packet generator 52 can retain the header and any correct data, but waits for corrected data associated with the error prior to transmitting or retransmission of a data packet. If an error was not detected in the data structure, the packet generator transmits the data packet with the uncorrected or speculative data, thus mitigating latency associated with waiting for the EDC component 42 to perform error detection and correction prior to building of the data packet.

The system 30 also includes a plurality of distributed control logic blocks 44, 54, 56, and 60. The control logic blocks 44, 54, 56, and 60 control the data flow and handshaking from the EDC component 42 to the data storage 58 and from the data storage 58 to the packet generator 52. In one embodiment, the packet generator 52 is operative to begin transmission of the data packet once it is determined that an error has not occurred in the tag. The packet generator 52 builds a header and begins extracting code word data from the data storage 58 and begins transmitting the data packet with the extracted data. If an error is detected in the data structure by the EDC component 42 in subsequent code words, the EDC begins providing dummy data into the data storage. The control logic blocks 44, 54, 56, and 60 associated with the EDC 42, the data storage 58 and the packet generator 64 are operative to provide and transmit dummy data including an indication (e.g., an invalid flag) that the subsequent data being transmitted is not valid. The EDC 42 then corrects the data and loads the corrected data into the data storage 58. The control logic blocks 44, 54, 56, and 60 associated with the EDC 42, the data storage 58 and the packet generator 52 are operative to provide and transmit the corrected data including an indication (e.g., a valid flag) that the subsequent data being transmitted is now valid.

Figure 3:
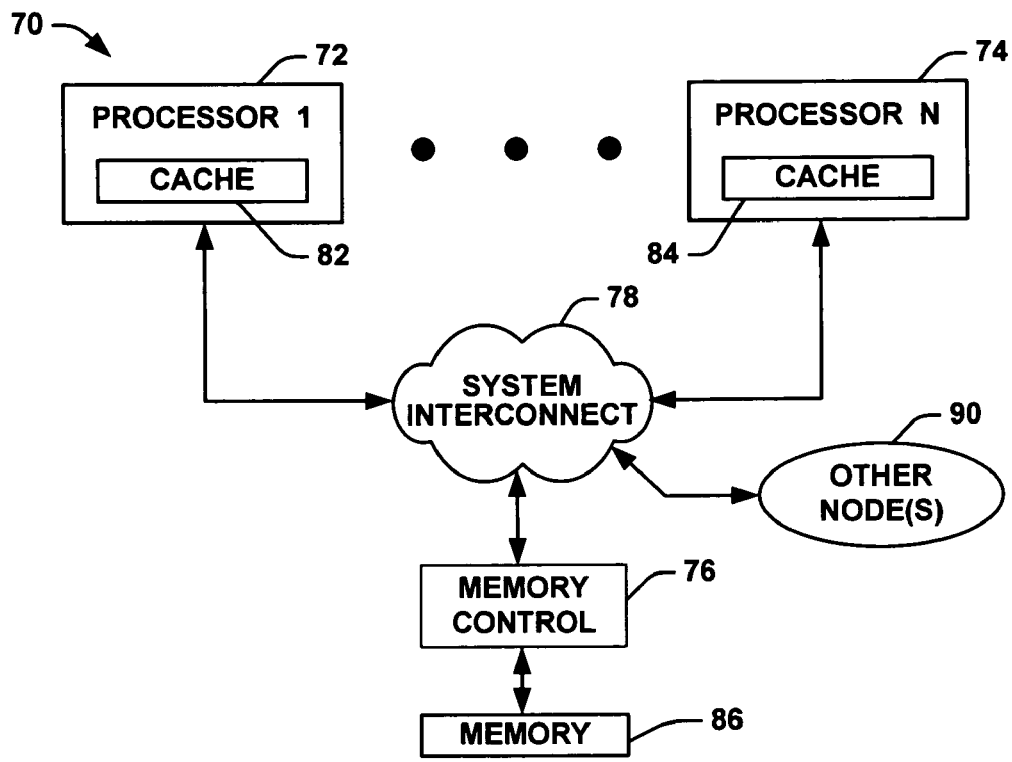
FIG. 3 illustrates a block diagram of an embodiment of a system that can utilize speculative data structures in building and transmitting data packets in response to a data structure request.

FIG. 3 depicts an example of a system 70 that can utilize speculative data structures in building and transmitting data packets in response to a data structure request. The system 70 illustrates a multi-processor environment that includes a plurality of processors 72 and 74 (indicated at PROCESSOR 1 through PROCESSOR N, where N is a positive integer (N>1)). The system 70 also includes memory 86, which can be implemented as a globally accessible aggregate memory. For example, the memory 86 can include one or more memory storage devices (e.g., dynamic random access memory (D)RAM)). A memory control 76 is associated with the memory 86. The memory control 76 provides for error detection and correction in addition to building and transmitting of packets with speculative data structures. The memory control 76 can include the devices and associated functions as illustrated in FIGS. 1-2.

The processors 72-74 and memory 86 define nodes in the system that can communicate with each other via requests and corresponding responses through a system interconnect 78. For example, the system interconnect 78 can be implemented as a switch fabric or a hierarchical switch. Also associated with the system 70 can be one or more other nodes, indicated schematically at 90. The other nodes 90 can correspond to one or more other multi-processor systems connected to the system interconnect 78, such as through an appropriate interconnect interface (not shown).

Each of the processors 72-74 includes at least one corresponding cache 82-84. For purposes of brevity, each of the respective caches 82-84 are depicted as unitary memory devices, although they may include a plurality of memory devices or different cache levels. Each of the caches 82-84 contains a plurality of cache lines. Each cache line has an associated address that identifies corresponding data stored in the line. The cache lines can also include information identifying the state of the data for the respective lines.

The system thus employs the caches 82-84 and the memory 86 to store blocks of data, referred to herein as "memory blocks" or "data structures". A memory block or data structure can occupy part of a memory line, an entire memory line or span across multiple lines. For purposes of simplicity of explanation, however, it will be assumed that a "memory block" or "data structure" occupies a single "memory line" in memory or a "cache line" in a cache. Additionally, a given memory block can be stored in a cache line of one or more caches as well as in a memory line of the memory 86.

The system 70 implements a cache coherency protocol to manage the sharing of memory blocks so as to guarantee coherence of data. The cache coherency protocol of the system 70 utilizes a plurality of states to identify the state of each memory block stored in a respective cache line and the memory 86. The coherency protocol establishes rules for transitioning between states, such as if data is read from or written to memory 86 or one of the caches 82-84.

As used herein, a node that issues a source request, such as a read or write request, defines a source node. Other nodes within the system 70 are potential targets of the request. Additionally, each memory block in the system 70 can be assigned a "home node" that maintains necessary global information and a data value for that memory block. The home node can be defined as a processor (or central processing unit), associated cache and associated memory/directory.

For example, when a source node, such as the processor 72, requires a copy of a given memory block, it typically first requests the memory block from its local, private cache by identifying the address associated with the memory block. If the data is found locally, the memory access is resolved without communication via the system interconnect 78. Where the requested memory block is not found locally, the source node 72 can request the memory block from the system 70, including the memory 86. In addition to the request identifying an address associated with the requested memory block, the request usually identifies the type of request or command being issued by the requester.

By way of example, assume that the processor 72 (a source node) requires a copy of data associated with a particular address, and assume that the data is unavailable from its own local cache 82. Since the processor 72 is unable to access the data in its local cache 82, the processor 72, as the source node, transmits a source request to other nodes and memory 86 via the system interconnect 78. For example, the request can correspond to a source read request for a memory block associated with the address identified in the request. The request also can identify what type of request is being issued by source node 72.

The source request is transmitted from the source processor 72 to a home node in the system 70. The home node retains location information (e.g., in a directory) of the owner of the requested cache line. The home node can include the memory 86 and associated memory control 76 for providing data structures associated with a source request. The memory control 76 can retrieve the associated data structure or memory block from the memory 86 in response to a source request. The memory control 76 performs error detection and correction on the data structure, while concurrently building a response packet associated with the data structure. The memory control 76 reviews a tag portion of the data structure and builds either a request packet if the data structure retrieved from memory is not the coherent copy of the data structure, or a data packet if the memory is the coherent copy of the data structure. The request packet can be a forward signal to the owner of the coherent copy of the data structure or a snoop request to the system requesting information regarding the owner of the coherent copy of the data structure.

The data packet can be built with speculative data and transmitted once it is determined that the speculative data is correct data, or the corrected data is received. Alternatively, the data packet can be transmitted as data is received by a packet generator associated with the memory control 76 in a pipeline manner, while the error detection and correction is performed on subsequent data. If an error is detected, dummy data can be transmitted, until the corrected data is received by the packet generator. The corrected data can then be transmitted until transmission has been completed.

Figure 6:
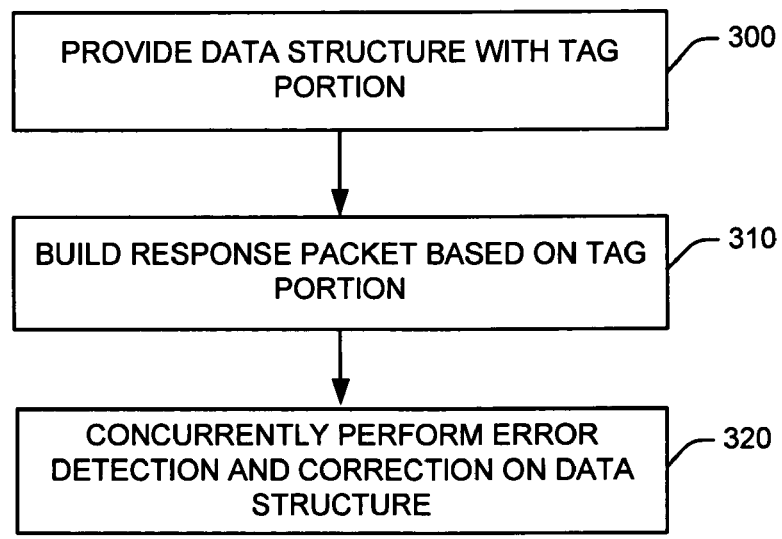
FIG. 6 illustrates another embodiment of a methodology for mitigating latency associated with error detection and correction of a data structure.
Figure 4:
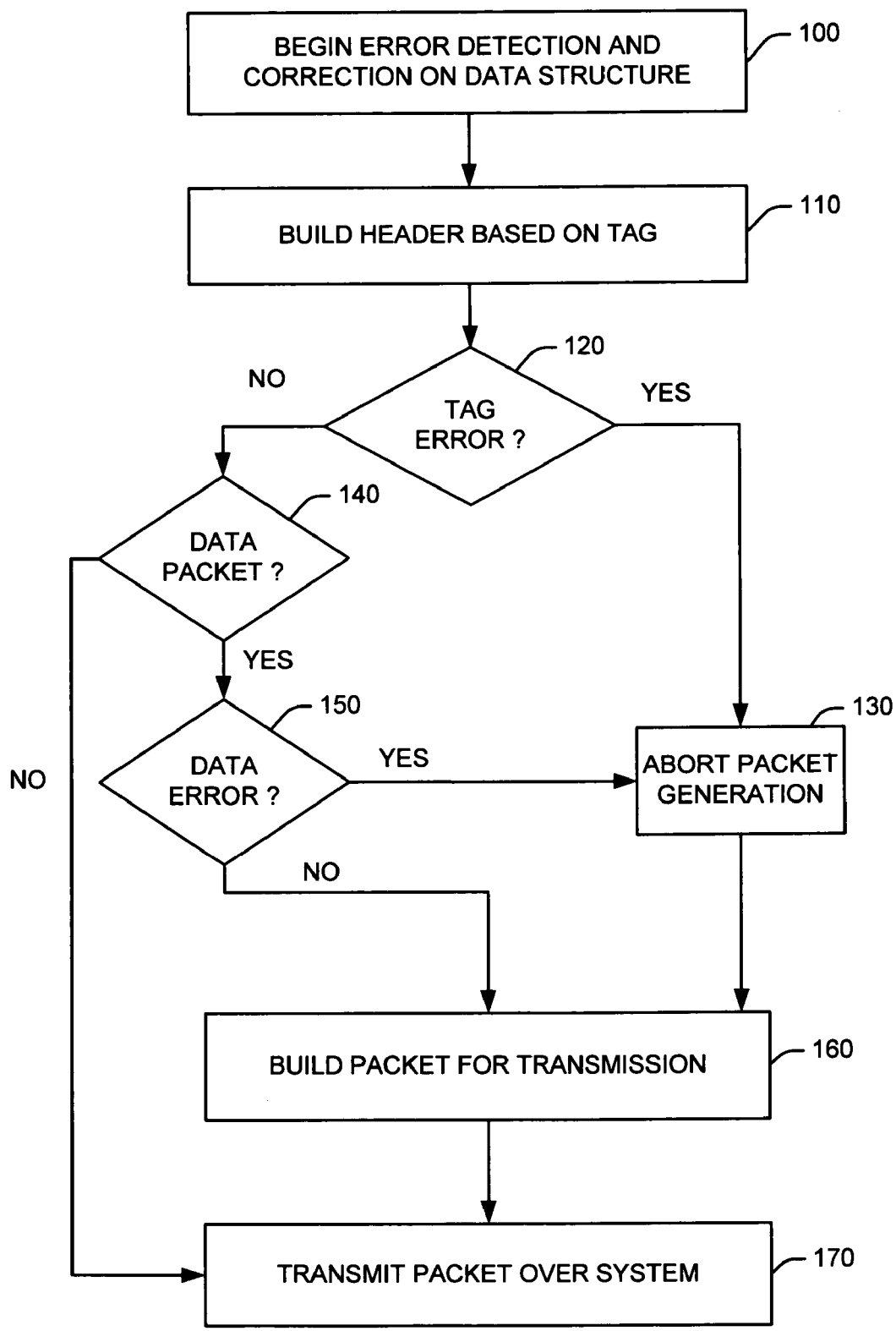
FIG. 4 illustrates an embodiment of a methodology for mitigating latency associated with error detection and correction of a data structure.
Figure 5:
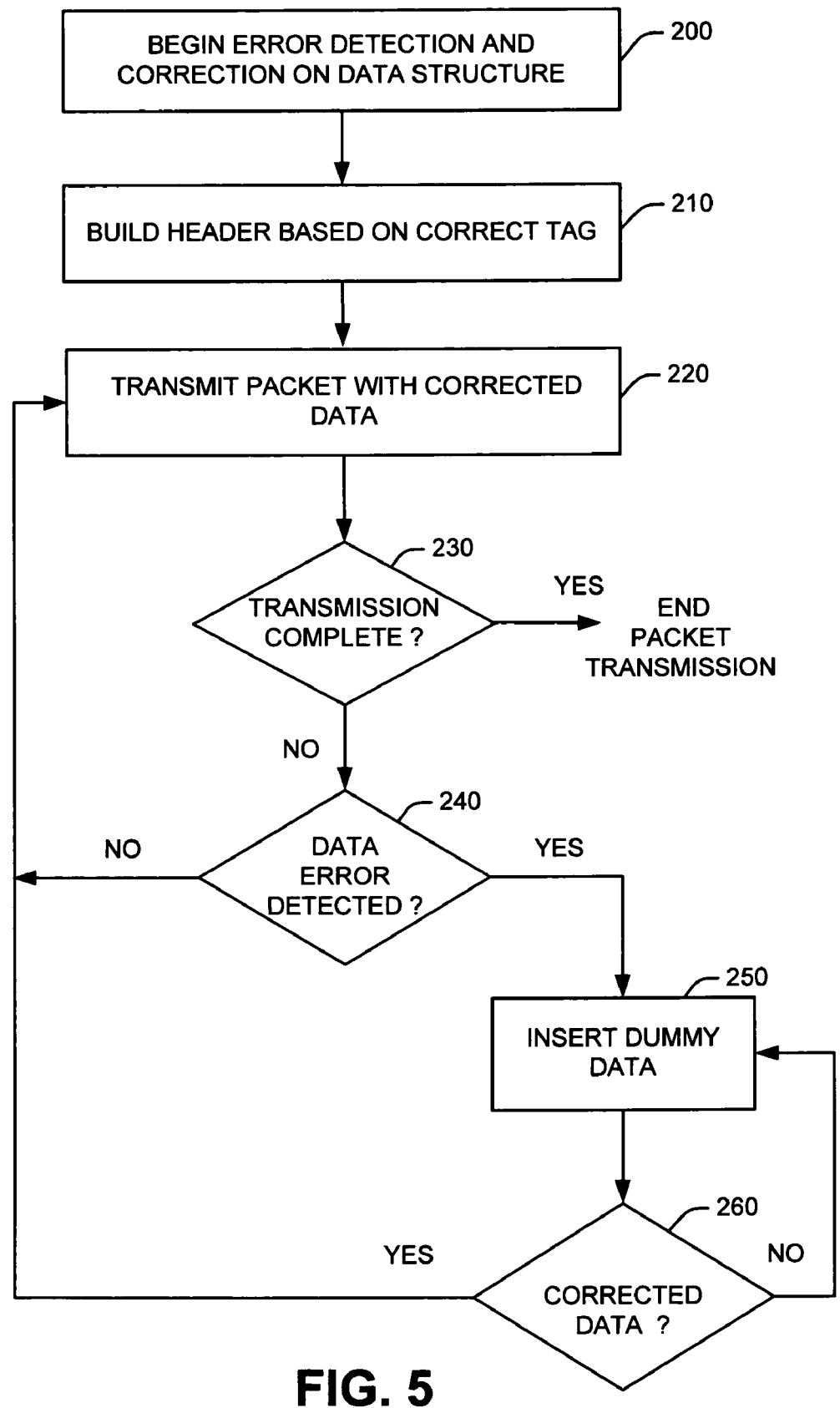
FIG. 5 illustrates an embodiment of methodology for mitigating latency associated with a data request.

In view of the foregoing structural and functional features described above, certain methods will be better appreciated with reference to FIGS. 4-6. It is to be understood and appreciated that the illustrated actions, in other embodiments, may occur in different orders and/or concurrently with other actions. Moreover, not all illustrated features may be required to implement a method.

FIG. 4 illustrates a methodology for mitigating latency associated with error detection and correction of a data structure. The methodology begins at 100 where error detection and correction begins on a data structure. The data structure can be a memory line or cache line provided in response to a request for the data structure from a corresponding memory or cache. The request can be from a processor in a multi-processor system, an I/O device or a variety of other devices that may request the data structure. The data structure includes a tag portion, ECC correction bits and a data portion. The data structure can be comprised of a plurality of code words, such that error detection and correction is performed on each of the plurality of code words in a sequential manner. The methodology then proceeds to 110.

At 110, a copy of a tag portion is extracted from the data structure. The tag portion identifies where the coherent version of the data structure resides. For example, the tag portion can provide an indication that the data structure is the coherent version, or that the coherent version resides in a cache associated with a multiprocessor system. The tag portion resides in a first code word associated with a plurality of code words forming the data structure. A header associated with a response packet to the data request is built based on information in the tag portion of the data structure. The header is built concurrently while error detection and correction is being performed sequentially on the code words. The methodology then proceeds to 120.

At 120, the methodology determines if a tag error has been detected. If a tag error has been detected (YES), the methodology proceeds to 130. At 130, the packet generation is aborted and a new packet is built for transmission at 160 with the corrected data. The methodology then proceeds to 170 to transmit the new packet that was built with the corrected data over the system. If a tag error has not been detected (NO) at 120, the methodology proceeds to 140. At 140, the methodology determines if the response packet is a data packet or a request packet based on the tag portion of the data structure. If the response packet is not a data packet (NO), the methodology proceeds to 170 to transmit the response packet in the form of the header over the system. If the response packet is a data packet (YES) at 140, the methodology proceeds to 150.

At 150, the methodology determines if an error has been detected in the data structure. For example, the error can be detected in one or more code words associated with the data structure. If an error is detected in the data structure (YES), the methodology proceeds to 130, to abort packet generation. A new packet is built for transmission at 160 with the corrected data. The methodology then proceeds to 170 to transmit the new packet that was built with the corrected data over the system. If an error is not detected in the data structure (NO) at 150, the methodology proceeds to 160. At 160, a data packet is built with the data associated with the data structure. At 170, the built data packet is transmitted over the system.

FIG. 5 illustrates a methodology for mitigating latency associated with a data request. The methodology of FIG. 5 illustrates an exemplary methodology for providing a data packet in response to a data structure request, such that it is determined that the data structure is the coherent version. The methodology begins at 200 where error detection and correction begins on a data structure. The data structure can be a memory line or cache line provided in response to a request for the data structure from a corresponding memory or cache. The request can be from a processor in a multi-processor system, and I/O device or a variety of other devices that may request the data structure. The data structure includes a tag portion, ECC correction bits and a data portion. The data structure can be comprised of a plurality of code words, such that error detection and correction is performed on each of the plurality of code words in a sequential manner. The methodology then proceeds to 210.

At 210, a header associated with a response packet to the data request is built based on information in a copy of a tag from a tag portion that is extracted from the data structure. The tag portion resides in a first code word associated with a plurality of code words forming the data structure. The header is built concurrently while error detection and correction is being performed sequentially on the code words. If an error is detected in the first code word, the header is rebuilt based on the corrected tag. If an error is not detected, the copy of the tag is the correct tag. The methodology then proceeds to 220.

At 220, the methodology begins transmitting the data packet with the data packet header and any correct data. For example, since error detection and correction is performed sequentially on the code words, the data associated with a given code word can be transmitted once it is determined to not have any errors. The methodology then proceeds to 230 to determine if transmission of the data packet has completed. If transmission of the data packet has completed (YES), the methodology terminates and data packet transmission is ended. If transmission of the data packet has not completed (NO), the methodology proceeds to 240.

At 240, it is determined if any error has been detected in the data associated with the code words. If it is determined that no error has been detected in the data associated with the code words (NO), the methodology returns to 220 to continue transmitting the data packet with correct data, determining if transmission has been completed at 230, and detecting errors at 240. If it is determined that an error has been detected in the data associated with the code words (YES), the methodology proceeds to 250.

At 250, the methodology inserts dummy data in the data packet in place of the data associated with the code words. The dummy data can include and indicator (e.g., invalid flag) that provides the requestor with an indication that the data being transmitted is not valid. The methodology then proceeds to 260 to determine if the corrected data has been received. If the corrected data has not been received (NO), the methodology returns to 250 to transmit the dummy data in the data packet until the corrected data is received. If the corrected data has been received (YES), the methodology returns to 220 to continue transmitting the data packet with the correct data. The corrected data can include an indicator (e.g., a valid flag) that provides the requestor with an indication that the data being transmitted is valid. The methodology continues transmitting the data packet with correct data, determining if transmission has been completed at 230, and detecting errors at 240, until the data packet has completed transmission.

Figure 7:
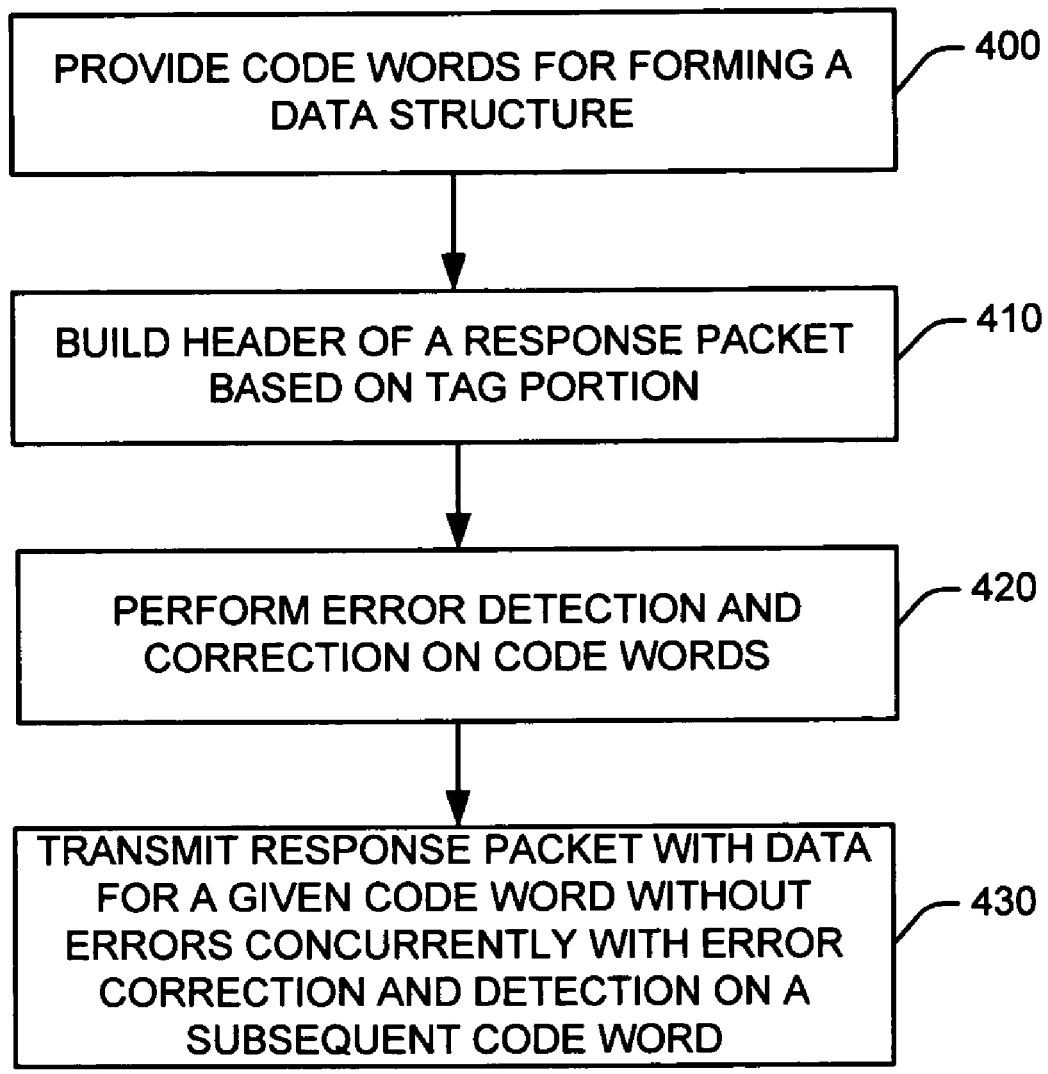
FIG. 7 illustrates yet another embodiment of a methodology for mitigating latency associated with error detection and correction of a data structure.

FIG. 7 illustrates a methodology for mitigating latency associated with a data request. The methodology begins at 400 where a plurality of code words is provided for forming a data structure in sequential order, such that a first code word is provided of the plurality of code words having a tag portion. At 410, a header of a response packet is built based on the tag portion. At 420, error detection and correction is performed on the plurality of code words in sequential order concurrently with the building of the header. At 430, the response packet is transmitted with data associated with a given code word that has been determined to be without errors concurrently with the performing of error detection and correction on a subsequent code word.

What have been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. A system, comprising:
    an error detection and correction component that receives a data structure, the data structure including a tag that indicates coherency of data in the data structure;
    a packet generator that builds a packet for transmission;
    a cache coherency controller that receives the tag portion of the data structure and issues a command to the packet generator to build either a request packet or a data packet that includes the data structure, based on the tag portion;
    wherein the packet generator builds a packet concurrently with the error detection and correction component checking for errors in the data structure; and
    the packet generator builds a data packet that includes the data in the data structure when the tag indicates that the data is the most up to date version of the data.

2. The system of claim 1, wherein the data structure is logically divided into multiple portions, the error detection and correction component checks for errors for each portion sequentially, and the packet generator transmits data from a particular portion once the error detection and correction circuit determines that data from the particular portion does not have errors.

3. The system of claim 2, wherein the packet generator transmits dummy data associated with a given portion of the data structure when the error and detection component determines that the given portion has an error, and the packet generator transmits valid data once the data associated with the given portion has been corrected.

4. The system of claim 1, wherein the packet generator aborts packet generation of the data packet if an error has been detected in the data structure.

5. The system of claim 1, wherein the packet generator builds at least a portion of a data packet based on speculative data associated with the data structure to mitigate latency associated with error detection and correction.

6. The system of claim 5, wherein:
    the speculative data comprises data for which error detection and correction has not been performed; and
    the error detection and correction component is configured to perform error detection and correction for the speculative data before the response packet is transmitted to a requestor of the data.

7. The system of claim 1, wherein the cache coherency controller maintains a state control structure that maintains status indicators associated with issued commands, the status indicators provide an indication of whether a given issue command is based on one of speculative data and known correct data.

8. The system of claim 1, further comprising a data storage that stores data associated with the data structure for transmitting with a data packet, wherein the data stored in the data storage includes at least one of speculative data and correct data.

9. The system of claim 1, further comprising a plurality of distributed control logic blocks operative to control the data flow and handshaking between components in the system.

10. The system of claim 1, being a multi-processor system.

11. The system of claim 1, wherein the packet generator builds at least a portion of the data packet with speculative data associated with the data structure to mitigate latency associated with error correction and detection.

12. The system of claim 1, wherein the packet generator builds a request packet that provides a request for the most up to date version of the data when the tag indicates that the data is not the most up to date version of the data.

13. A memory system comprising:
    an error detection and correction (EDC) component that detects and corrects errors in given code word associated with a data structure formed from a plurality of code words;
    a packet generator that builds a response packet based on a tag portion of the data structure residing in a first code word of the plurality of code words, the tag portion indicating whether data in the data structure is the most up to date version of the data;
    a cache coherency controller that receives the tag portion and issues a command to the packet generator to build either a request packet or a data packet that includes the data structure based on the tag portion; and
    a plurality of memory devices that store the data structure based on a given memory address, and provide the EDC component the plurality of code words in response to a request for the data structure;
    wherein the EDC component receives the plurality of code words in a sequential manner and forwards a copy of the tag portion from the first code word to the packet generator to facilitate the building of a response packet by the packet generator concurrently with the error detection and correction of the data structure.

14. The system of claim 13, wherein the cache coherency controller maintains a state control structure that maintains status indicators associated with issued commands, the status indicators provide an indication of whether a given issue command is based on one of speculative data and known correct data.

15. The system of claim 13, wherein the EDC component provides a speculative status indicator to the packet generator, the speculative status indicator informing the packet generator if an error has been detected in at least a portion of the data structure.

16. The system of claim 15, wherein the packet generator aborts packet generation of the response packet if an error has been detected in at least the tag portion of the data structure.

17. The system of claim 13, further comprising a data storage that stores data associated with the data structure for transmitting with a data packet, wherein the data stored in the data storage includes at least one of speculative data and known correct data.

18. A system for correcting errors in a data structure in response to a request for the data structure, the system comprising:
    means for performing error detection and correction on a data structure that includes a tag portion, the tag portion indicating whether data in the data structure is the most up to date version of the data;

means for issuing a command to build a response packet based on the tag portion of the data structure;

wherein the means for performing error detection and correction forwards a copy of the tag portion to the means for issuing in response to receiving at least the tag portion of the data structure to facilitate concurrent building of a response packet associated with the data structure with error detection and correction of the data structure; and means for building a response packet based on the issue command concurrently with the error detection and correction on the data structure.

19. The system of claim 18, further comprising means for providing an indication if an error has been detected in at least the portion of the data structure to the means for building a response packet, the means for building a response packet aborting building of the response packet if an error is detected in at least the tag portion of the data structure, and building a new response packet based on known correct data associated with the data structure.

20. A method for mitigating latency associated with error detection and correction of a data structure, the method comprising:

providing a data structure in response to a request for the data structure, the data structure having a tag portion, the tag portion indicating whether data in the data structure is the most up to date version of the data;

receiving, by a cache coherency controller, the tag portion of the data structure;

issuing a command, by the cache coherency controller, to the packet generator, to build a response packet, wherein the building a response packet comprises building either a request packet or a data packet that includes the data structure, based on the tag portion;

building a response packet based on the tag portion; and performing error detection and correction on the data structure concurrently with the building of the response packet.

21. The method of claim 20, further comprising transmitting the response packet if no errors are detected in the data structure.

22. The method of claim 20, wherein the performing error detection and correction comprises performing error detection on each of a given code word of a plurality of code words forming the data structure, a first code word of the plurality of code words containing the tag portion.

23. The method of claim 22, further comprising aborting the building of the response packet if an error has been detected in the first code word.

24. The method of claim 20, further comprising aborting the building of the response packet if an error has been detected in the data structure and the response packet is a data packet.

25. A method for mitigating latency associated with a data request, the method comprising:

providing a plurality of code words forming a data structure in sequential order, a first code word provided of the plurality of code words having a tag portion;

building a header of a response packet based on the tag portion;

performing error detection and correction on the plurality of code words in sequential order concurrently with the building of the header; and transmitting the response packet with data associated with a given code word that has been determined to be without errors concurrently with the performing of error detection and correction on a subsequent code word.

26. The method of claim 25, further comprising transmitting dummy data in the response packet in place of data associated with a subsequent code word that has been determined to have an error, and transmitting corrected data associated with the subsequent code word once the data associated with the subsequent code word has been corrected.

27. The method of claim 26, further comprising providing an invalid flag with the transmitting of the dummy data, and a valid flag with the transmitting of the corrected data.

* * * * *